(12) United States Patent
Ponnusamy et al.

(10) Patent No.: US 11,674,828 B2
(45) Date of Patent: Jun. 13, 2023

(54) MOLDED IN MAGNETIC SENSOR AND SYSTEMS, ASSEMBLIES, COMPONENTS, AND METHODS THEREOF

(71) Applicant: Caterpillar Inc., Peoria, IL (US)

(72) Inventors: Ananda S. Ponnusamy, Naperville, IL (US); Kurt S. Goslovich, Naperville, IL (US); Satish B. Nutakki, Chicago, IL (US)

(73) Assignee: Caterpillar Inc., Peoria, IL (US)

( * ) Notice: Subject to any disclaimer, the term of this patent is extended or adjusted under 35 U.S.C. 154(b) by 239 days.

(21) Appl. No.: 17/122,687

(22) Filed: Dec. 15, 2020

(65) Prior Publication Data
US 2022/0187106 A1    Jun. 16, 2022

(51) Int. Cl.
| | | |
|---|---|---|
| *G01D 5/48* | (2006.01) | |
| *F15B 15/28* | (2006.01) | |
| *G01D 11/24* | (2006.01) | |

(52) U.S. Cl.
CPC ......... *G01D 5/485* (2013.01); *F15B 15/2861* (2013.01); *G01D 11/245* (2013.01)

(58) Field of Classification Search
CPC ... G01D 5/485; G01D 11/245; F15B 15/2861; F15B 15/2884; F15B 15/1447; F15B 15/1457; F15B 15/2892
See application file for complete search history.

(56) References Cited

U.S. PATENT DOCUMENTS

| | | | |
|---|---|---|---|
| 5,150,049 A | * | 9/1992 | Schuetz .............. F15B 15/2884 |
| | | | 324/207.13 |
| 5,789,917 A | | 8/1998 | Oudet et al. |
| 6,194,894 B1 | | 2/2001 | Apel et al. |
| 6,315,457 B1 | * | 11/2001 | Kapaan ................. B60B 27/001 |
| | | | 384/537 |
| 6,509,734 B1 | | 1/2003 | Luetzow |
| 7,174,795 B2 | | 2/2007 | Feng et al. |
| 9,347,795 B2 | | 5/2016 | Storrie et al. |

(Continued)

FOREIGN PATENT DOCUMENTS

| | | |
|---|---|---|
| CN | 110540146 B | 8/2020 |
| DE | 102006047966 A1 | 1/2008 |

(Continued)

OTHER PUBLICATIONS

Written Opinion and International Search Report for Int'l. Patent Appln. No. PCT/US2021/062315, dated Mar. 1, 2022 (15 pgs).

*Primary Examiner* — Alvaro E Fortich
*Assistant Examiner* — Zannatul Ferdous
(74) *Attorney, Agent, or Firm* — Xsensus, LLP (57) ABSTRACT

Systems, assemblies, and methods can involve a retainer assembly adapted to interface with a sensor rod of an in-cylinder position sensor assembly of a fluid cylinder. The retainer assembly can comprise an annular body that defines a bore extending from a first end of the annular body to a second end of the annular body opposite the first end; a sleeve disposed in the bore at an inner wall of the annular body; and one or more magnets fixedly provided between the annular body and the sleeve in a radial direction of the annular body. Each of the one or more magnets may be fixedly molded in place between the annular body and the sleeve in the radial direction of the annular body.

19 Claims, 7 Drawing Sheets

(56) References Cited

U.S. PATENT DOCUMENTS

| | | | |
|---|---|---|---|
| 2002/0074994 A1 | 6/2002 | Blubaugh et al. | |
| 2003/0122539 A1* | 7/2003 | Heimann, Jr. | G01P 3/488 324/207.22 |
| 2011/0126844 A1* | 6/2011 | Cinquin | A61B 17/3403 128/845 |
| 2013/0277114 A1* | 10/2013 | Hook | E21B 47/017 175/50 |
| 2017/0296039 A1* | 10/2017 | Kanno | A61B 1/00126 |

FOREIGN PATENT DOCUMENTS

| | | |
|---|---|---|
| EP | 1867880 B1 | 6/2009 |
| JP | 11190308 A | 7/1999 |

* cited by examiner

MOLDED IN MAGNETIC SENSOR AND SYSTEMS, ASSEMBLIES, COMPONENTS, AND METHODS THEREOF

TECHNICAL FIELD

The present disclosure relates to linear fluid cylinders, and more particularly to linear fluid cylinders having an internally-mounted linear cylinder position sensor retainer assembly and systems, assemblies, components, and methods thereof.

BACKGROUND

Linear fluid cylinders may have an in-cylinder position sensor having one or more magnets. However, the in-cylinder position sensor in conventional linear fluid cylinders may be susceptible to malfunction, damage, or failure. For instance, the magnets may be assembled into a rod bore assembly (used for holding a sensor rod) such that the magnets are damaged, such that the magnets are improperly installed (including forgotten), or such that the magnets displace from their intended location prior to assembly into the rod bore assembly (since the magnets may move freely). There is the additional possibility that the either the magnets or a metal retainer thereof contacts the sensor rod.

U.S. Pat. No. 6,194,894 ("the '894 patent") describes a rotation angular sensor with a metal-injection molded magnet holder. According to the '894 patent, to make it possible for a rotation angle sensor to be manufactured and assembled more easily and more accurately, the part components of a stator element made of a ferritic material are held in a sintered stator body by at least one holding element in a holding recess of a base element made of a non-magnetizable material. However, in that the '894 patent describes a rotational angular sensor, the '894 patent is not understood to describe a linear sensor.

SUMMARY

According to an aspect a method regarding a retainer assembly adapted to interface with a sensor rod of an in-cylinder position sensor assembly of a fluid cylinder is described or implemented. The method can comprise: providing an annular body of the retainer assembly, the annular body defining a bore extending from a first end of the annular body to a second end of the annular body opposite the first end; providing a sleeve of the retainer assembly, the sleeve being disposed in the bore at an inner wall of the annular body; and providing one or more magnets of the retainer assembly, the one or more magnets being fixedly molded between the annular body and the sleeve in a radial direction of the annular body.

In another aspect, a retainer assembly adapted to interface with a sensor rod of an in-cylinder position sensor assembly of a fluid cylinder is disclosed or provided. The retainer assembly can comprise: an annular body defining a bore extending from a first end of the annular body to a second end of the annular body opposite the first end, the bore being adapted to receive the sensor rod such that the sensor rod extends from the first and second ends of the annular body; a sleeve disposed in the bore at an inner wall of the annular body, a length of the sleeve being less than a length of the annular body; and one or more magnets fixedly molded between the annular body and the sleeve in a radial direction of the annular body.

And in another aspect a hydraulic cylinder is disclosed or provided. The hydraulic cylinder can comprise: an elongate body defining an internal cavity that extends along a longitudinal axis of the elongate body; a pair of end caps at opposite ends of the elongate body; a piston and rod assembly at least partially in the internal cavity, the piston and rod assembly being movable in a direction of the longitudinal axis; a position sensor and a sensor rod in the internal cavity, the sensor rod extending along the longitudinal axis; and a sensor retainer assembly in the internal cavity. The sensor retainer assembly can be coaxial with the sensor rod and adapted to retain the sensor rod at the longitudinal axis. The sensor retainer assembly can include: an annular body defining a bore extending from opposite ends of the annular body, the bore being adapted to receive the sensor rod such that the sensor rod extends from the opposite ends of the annular body, a magnet ring disposed in the bore at an inner wall of the annular body, the magnet ring being radially outward of the sensor rod, and one or more magnets fixedly disposed between the annular body and the magnet ring in a radial direction of the annular body, the one or more magnets being radially outward of the sensor rod.

Other features and aspects of this disclosure will be apparent from the following description and the accompanying drawings.

DETAILED DESCRIPTION

The present disclosure relates to linear fluid cylinders, and more particularly to linear fluid cylinders having an internally-mounted linear cylinder position sensor retainer assembly and systems, assemblies, components, and methods thereof.

Figure 1:
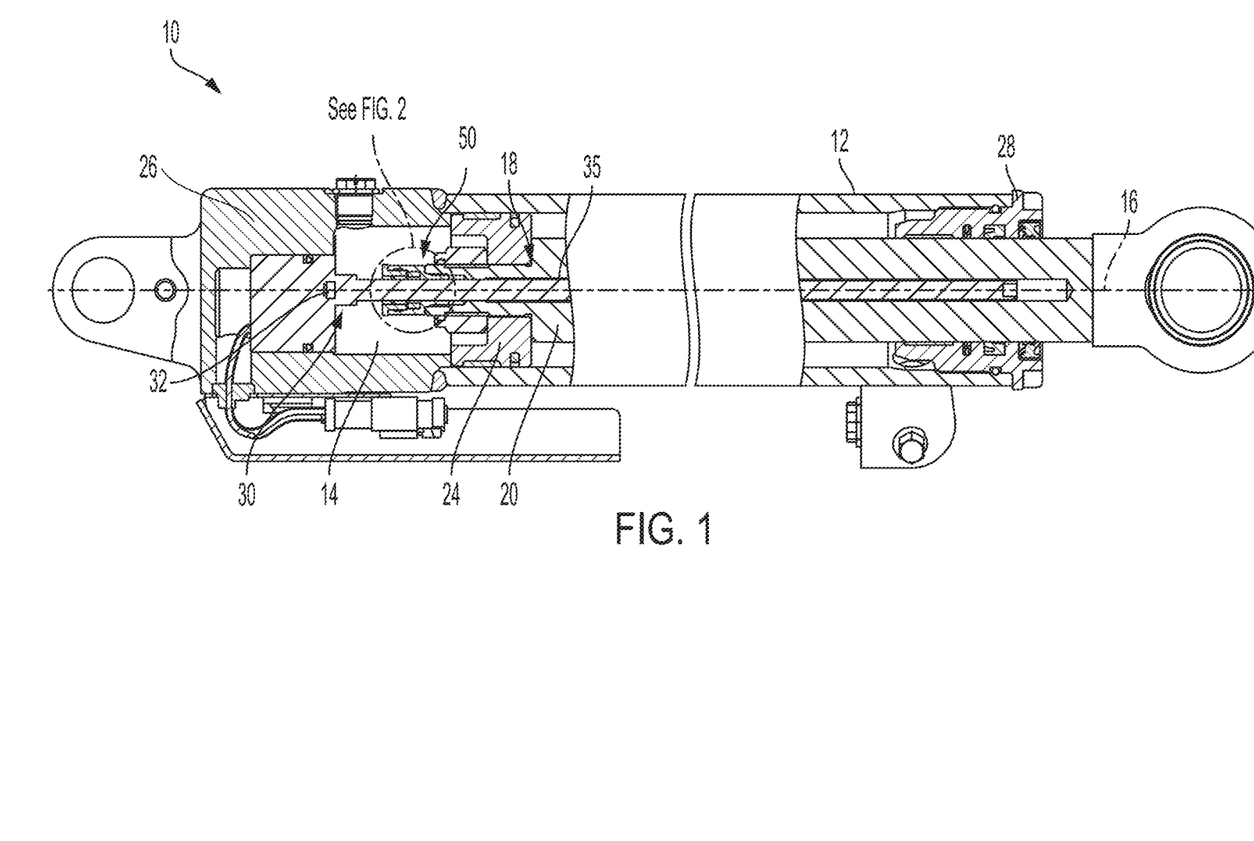
FIG. 1 is a sectional view of a fluid cylinder according to one or more embodiments of the disclosed subject matter.

FIG. 1 is a sectional view of a fluid cylinder 10 according to one or more embodiments of the disclosed subject matter. The fluid cylinder 10 can be hydraulic or pneumatic.

The fluid cylinder 10 can include a body 12. The body 12 can be elongate such as shown in FIG. 1 and define an internal cavity 14. According to one or more embodiments, the body 12 and the internal cavity 14 can be cylindrical. A longitudinal axis 16 can extend through the body 12 and the internal cavity 14. A first end cap 26 and a second end cap 28 may be provided at opposite ends of the body 12. A piston and rod assembly 18, which can be movable in a direction of the longitudinal axis 16, can be disposed at least partially in the internal cavity 14, such as shown in FIG. 1. The piston and rod assembly 18 can include a rod 20 having a first end connected to a piston 24, such as shown in FIG. 1. A second end of the rod 20 can extend from the second end cap 28. It is noted that embodiments of the disclosed subject matter are not limited to the specific piston and rod assembly 18 shown in FIG. 1. For instance, embodiments of the disclosed subject matter can include a piston and rod assembly 19 having a rod 21 with a counterbore 22 at an end thereof.

A position sensor assembly 30 can be provided in the fluid cylinder 10. In that the position sensor assembly 30 can be provided in the fluid cylinder 10, the position sensor assembly 30 may be referred to as an in-cylinder position sensor assembly. The position sensor assembly 30 can include a sensor 32 and a sensor rod 35. According to some embodiments, the sensor rod 35 may be referred to as a pressure pipe. As shown in FIG. 1, the sensor rod 35 can extend in the internal cavity 14 along the longitudinal axis 16 and, moreover, can be cooperatively telescopically received within an axial passage of the rod 20.

Generally, the sensor 32 can be a magnetostrictive type sensor and the position sensor assembly 30 can be adapted to determine position of the piston and rod assembly 18. In this regard, the sensor rod 35 can include a magnetorestrictive element or waveguide that can interact with one or more magnets (e.g., angular magnet(s)) associated with the piston and rod assembly 18 (discussed in more detail below). However, embodiments of the disclosed subject matter are not limited to magnetorestrictive sensors and may include another type of linear sensor, such as a Hall effect sensor.

The fluid cylinder 10 can also include a retainer assembly 50 according to embodiments of the present disclosure in the internal cavity 14. As shown in FIG. 1, the retainer assembly 50 can interface with the piston and rod assembly 18 and the sensor rod 35. More specifically, the retainer assembly 50 can be coaxial with the sensor rod 35 whereby the sensor rod 35 can extend through the retainer assembly 50 and project from both ends of the retainer assembly 50. Discussed in more detail below, at least a portion of the retainer assembly 50 can contact the sensor rod 35 and provide support for the sensor rod 35 in at least the radial direction. Thus, the retainer assembly 50 may retain the sensor rod 35 at the longitudinal axis 16.

Figure 2:
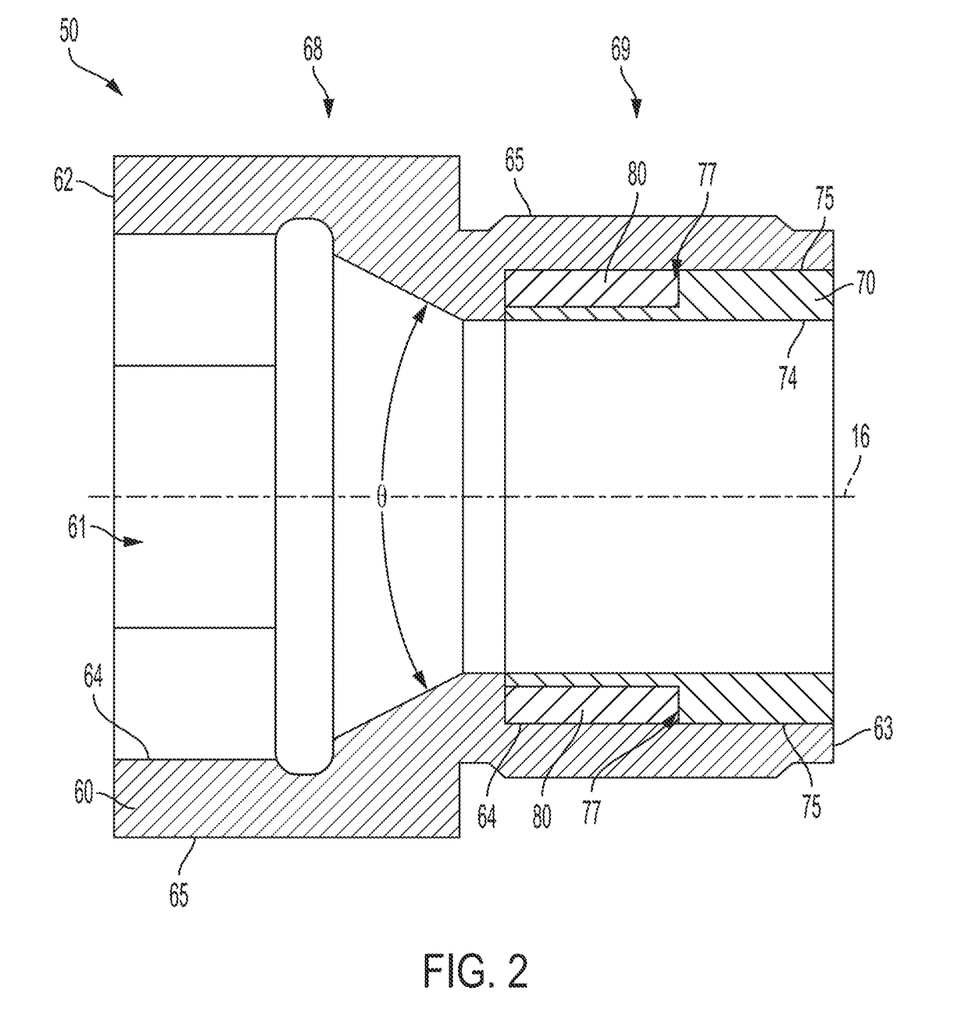
FIG. 2 is an enlarged view of a portion of the fluid cylinder of FIG. 1.

Turning now to FIG. 2, the retainer assembly 50 can be comprised of a body 60, a sleeve 70, and one or more magnets 80. According to one or more embodiments, the body 60, the sleeve 70, and the one or more magnets 80 may be the only components of the retainer assembly 50. Thus, the retainer assembly 50 may consist of the body 60, the sleeve 70, and the one or more magnets 80.

The body 60 can be annular and define a bore 61 that extends from a first end 62 of the body 60 to a second end 63 of the body 60. The bore 61 may be defined by an inner wall 64 of the body 60 opposite an outer wall 65 of the body 60. The bore 61 can be adapted to receive the sensor rod 35, such as shown in FIG. 1 discussed above, whereby the sensor rod 35 extends from the first end 62 and the second end 63 of the body 60. According to one or more embodiments, the body 60 can be made of any non-ferromagnetic material, such as brass, aluminum, stainless steel, plastic, composite, etc. According to one or more embodiments, plain carbon steel or cast iron may not be used as a material for the body 60, unless the one or more magnets 80 are prevented from direct contact with the body 60.

The body 60 can be considered to have a first body portion 68 and a second body portion 69. The first body portion 68 and the second body portion 69 can be associated with (and indeed include) the first end 62 and the second end 63 of the body 60, respectively.

As shown in FIG. 2, the bore 61 can have a greater cross-sectional area or diameter, as defined by the inner wall 64, at the first end 62 as compared to the second end 63. Also shown in FIG. 2, the inner wall 64 can taper at an angle θ relative to the longitudinal axis 16 (e.g., at or about sixty degrees combined for opposite sides of the inner wall 64). Such tapering can facilitate passage of the sensor rod 35 through the retainer assembly 50. An inner diameter of the inner wall 64 may be constant from the second end 63 for a predetermined length. Such length can be the same length as that of the sleeve 70. According to one or more embodiments, the inner wall 64 at the first end 62 of the body 60 can be in the form of a hexagon (or some other polygon) when viewed from the first end 62 of the body 60. The shape of the inner wall 64 at the first end 62 can match a torque tool (e.g., a hex key) to assemble the body 60 to the corresponding piston and rod assembly 18, 19.

Figure 7:
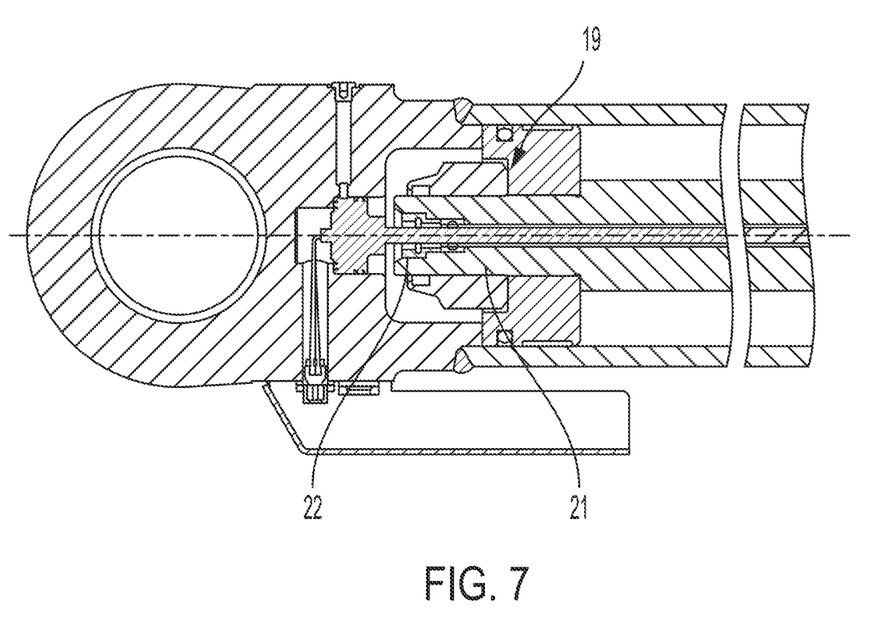
FIG. 7 shows a sectional view of a portion of a fluid cylinder according to one or more embodiments of the disclosed subject matter.

Additionally or alternatively, an outer diameter of the body 60, as defined by the outer wall 65, can be greater at a first end portion of the body 60 associated with the first end 62 of the body 60 as compared to an outer diameter of the body 60, as defined by the outer wall 65, at a second end portion of the body 60 associated with the second end 63 of the body 60. According to one or more embodiments, the outer diameter of the outer wall 65 for the first body portion 68 can be constant and the outer diameter of the outer wall 65 for the second body portion 69 can vary, such as according to the plateau and valleys shown in FIG. 2. The relief features of the outer wall 65 at the second body portion 69 can be to reliably and effectively interface with the piston and rod assembly 18. Depending upon whether the first body portion 68 is exposed (as in FIG. 1) or unexposed (e.g., inside the counterbore 22 at the end of the rod 21 as in FIG. 7), some or all of the outer wall 65 can be threaded to interface with the corresponding piston and rod assembly 18, 19. For instance, when the first body portion 68 is exposed the outer wall 65 at the first body portion 68 may not have threads and some or all of the outer wall 65 at the second body portion 69 may be threaded. On the other hand, when the first body portion 68 is not exposed, threads may be provided in the outer wall 65 at the first body portion 68 and/or at the second body portion 69.

The sleeve 70 can be annular or in the form of a ring and can be made of a non-metal or non-metallic durable material or composite. The material/composite can be particularly resistant to wear against metal without abrading and/or generating hard particles. For instance, the sleeve 70 can be made of nylon (polyamide) filled with an additive, such as glass. Of course, embodiments of the disclosed subject matter are not limited to the foregoing materials for the sleeve 170. Alternatively, the sleeve 70 can be polytetrafluoroethylene (PTFE) filled/unfilled material. The sleeve 70 can be disposed in the bore 61 of the body 60 at a portion of the inner wall 64 such as shown in FIG. 2. Thus, the sleeve 70 can be radially outward of the sensor rod 35, such as shown in FIG. 1. More specifically, the inner wall 74 of the sleeve 70 can contact the sensor rod 35. In this regard, the sleeve 70 can protect the sensor rod 35 as the sensor rod 35 travels along the longitudinal axis 16 during operation of the fluid cylinder 10.

The length of the sleeve 70 can be less than the length of the body 60. According to one or more embodiments, no portion of the sleeve 70 extends from either the first end 62 or the second end 63 of the body 60. Such extending may also mean that an inner-most diameter of the sleeve 70, as defined by the inner wall 74 of the sleeve 70, is not less than an inner-most diameter of the inner wall 64 of the body 60. According to one or more embodiments, the inner wall 74 of the sleeve 70 can have a constant diameter. In some respects, the inner wall 74 of the sleeve 70, when fitted in the bore 61 of the body 60, can effectively form an inner wall that defines that portion of the bore 61.

Each of the one or more magnets 80 can be an angular magnet and can be disposed radially outward of at least a portion of an outer wall 75 of the sleeve 70. Thus, each of the one or more magnets 80 can be disposed between the sleeve 70 and the body 60, at least in a radial direction of the body 60. In this regard, the one or more magnets 80 can be provided also radially outward of the sensor rod 35. However, as shown in FIG. 2, no portion of the one or more magnets 80 may be exposed from the body 60 or the sleeve 70. Thus, no portion of the one or more magnets 80 can contact the sensor rod 35 as the sensor rod 35 moves along the longitudinal axis during operation of the fluid cylinder 10. Optionally, the one or more magnets 80 can be provided in a cutout (or cutouts) 77 of the sleeve 70, such as shown in FIG. 2.

At least a portion of the outer wall 75 of the sleeve 70 can be fixed to the inner wall 64 of the body 60. According to embodiments of the disclosed subject matter, the outer wall 75 of the sleeve 70 can be fixed to the inner wall 64 via friction fit, snap fit, or threading. The sleeve 70 in FIG. 2, for instance, can be inserted in the bore 61 such that the outer wall 75 frictionally engages with the inner wall 64 of the body 60.

Each of the one or more magnets 80 can be fixedly disposed between the sleeve 70 and the body 60. For instance, at the very least the sleeve 70 retained in the bore 61 can retain the one or more magnets 80 in position. Hence, according to one or more embodiments, the sleeve 70 may be referred to as a magnet ring. The one or more magnets 80 may also be molded between the body 60 and the sleeve 70. According to embodiments of the disclosed subject matter, the one or more magnets 80 can be so-called in-molded to the inner wall 64 of the body 60 or can be so-called out-molded to the outer wall 75 of the sleeve 70. Such molding can occur prior to inserting the sleeve 70 into the bore 61 to fixedly attach the sleeve 70 to the body 60.

Figure 3:
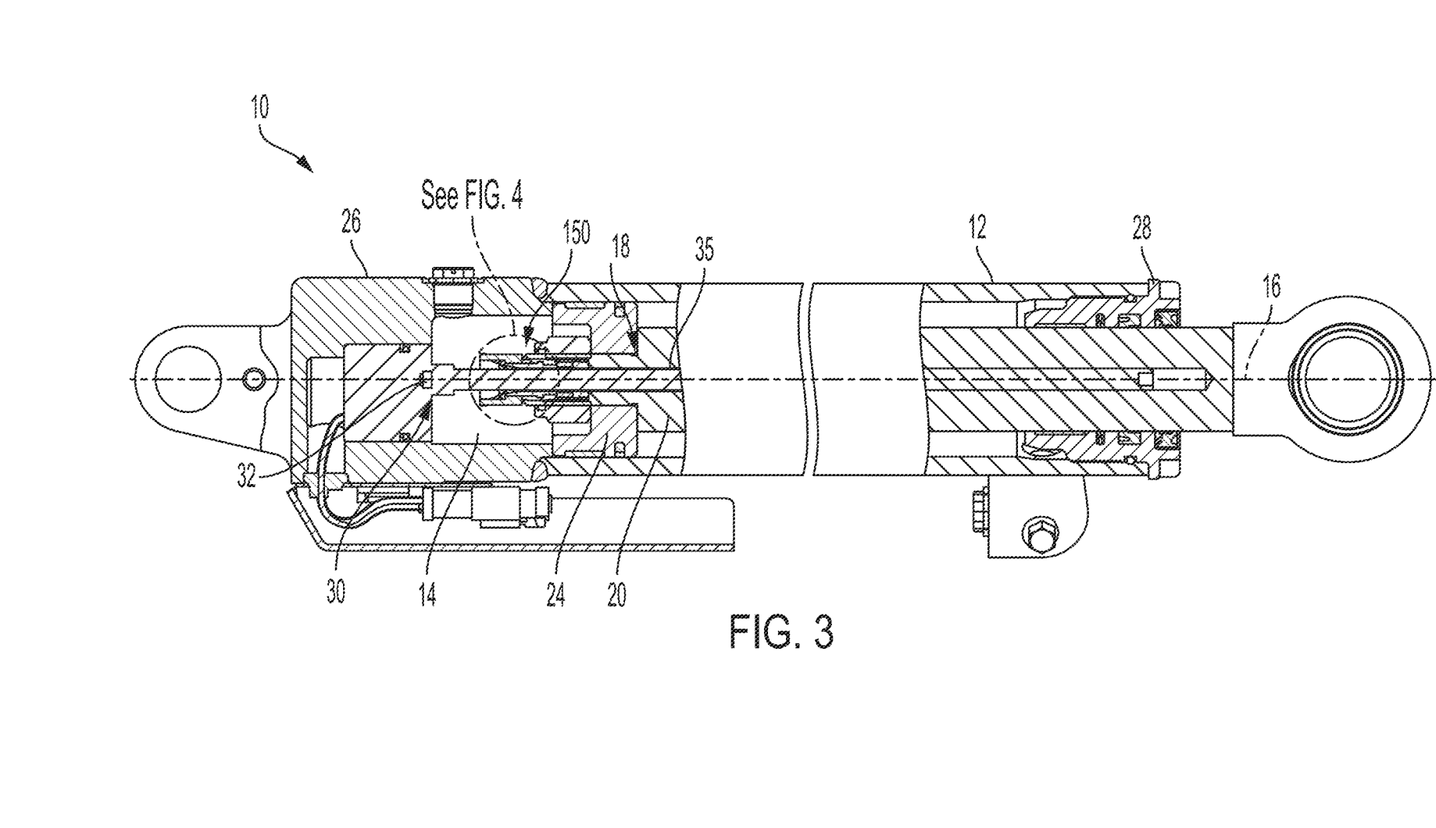
FIG. 3 is a sectional view of a fluid cylinder according to one or more embodiments of the disclosed subject matter.
Figure 4:
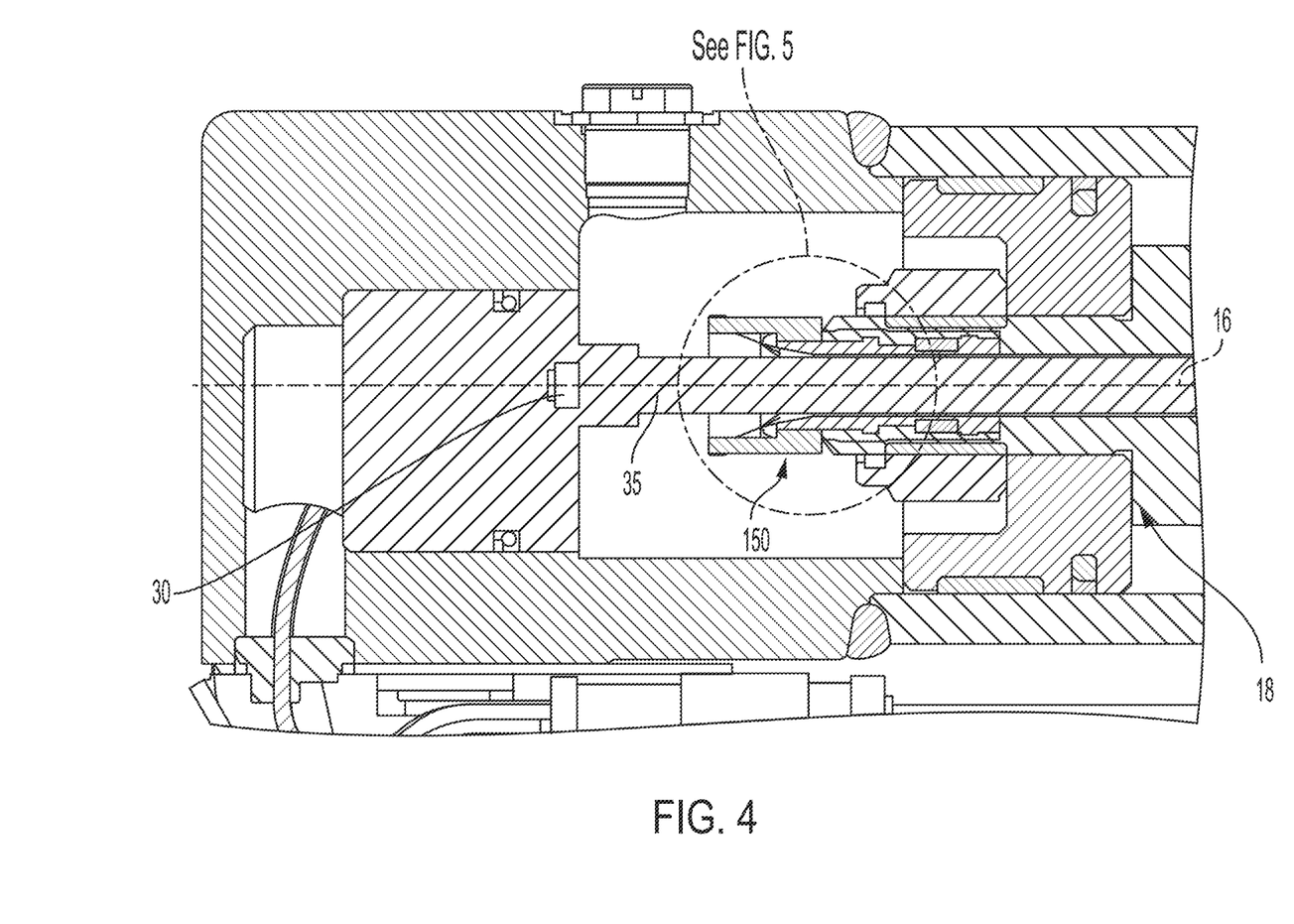
FIG. 4 is a sectional view of a retainer assembly of the fluid cylinder of FIG. 3, according to one or more embodiments of the disclosed subject matter.

FIG. 3 is a sectional view of a fluid cylinder 10 according to one or more embodiments of the disclosed subject matter. Fluid cylinder 10 is similar to the fluid cylinder 10 discussed above for FIG. 1, but notably implements another retainer assembly 150 according to embodiments of the disclosed subject matter. FIG. 4 shows an enlarged portion of FIG. 3, and FIG. 4 shows a sectional view of the retainer assembly 150.

The retainer assembly 150 can be comprised of a body 160, a sleeve 170, and one or more magnets 180. According to one or more embodiments, the body 160, the sleeve 170, and the one or more magnets 180 may be the only components of the retainer assembly 150. Thus, the retainer assembly 150 may consist of the body 160, the sleeve 170, and the one or more magnets 180.

The body 160 can be annular and define a bore 161 that extends from a first end 162 of the body 160 to a second end 163 of the body 160. The bore 161 may be defined by an inner wall 164 of the body 160 opposite an outer wall 165 of the body 160. The bore 161 can be adapted to receive the sensor rod 35, such as shown in FIG. 3 and FIG. 4, whereby the sensor rod 35 extends from the first end 162 and the second end 163 of the body 160. According to one or more embodiments, the body 160 can be made of any non-ferromagnetic material, such as brass, aluminum, stainless steel, plastic, composite, etc. According to one or more embodiments, plain carbon steel or cast iron may not be used as a material for the body 160, unless the one or more magnets 180 are prevented from direct contact with the body 160.

The body 160 can be considered to have a first body portion 168 and a second body portion 169. The first body portion 168 and the second body portion 169 can be associated with (and indeed include) the first end 162 and the second end 163 of the body 160, respectively.

Figure 5:
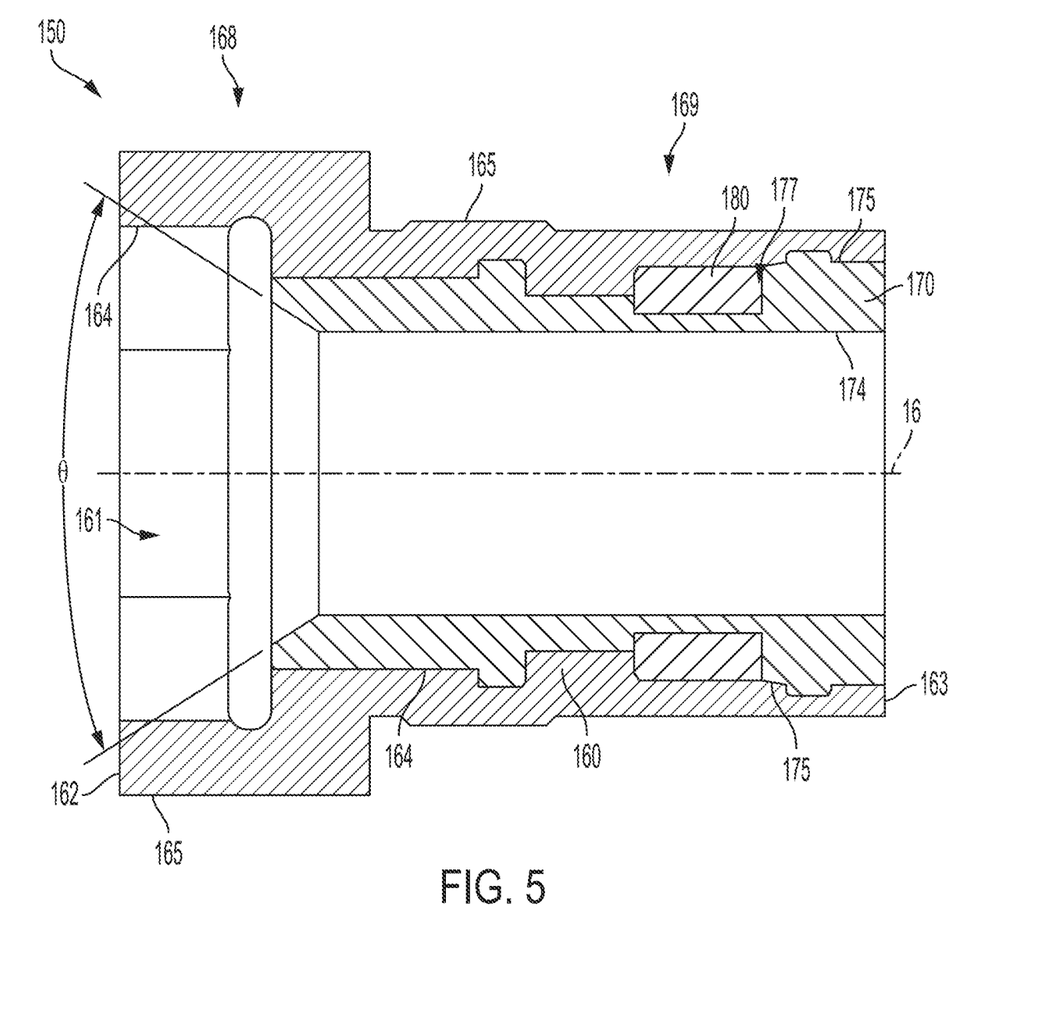
FIG. 5 is an enlarged sectional view of a retainer assembly of the fluid cylinder of FIG. 4, according to one or more embodiments of the disclosed subject matter.

As shown in FIG. 5, the bore 161 can have a greater cross-sectional area or diameter, as defined by the inner wall 164, at the first end 162 as compared to the second end 163. According to one or more embodiments, the inner wall 164 at the first end 162 of the body 160 can be in the form of a hexagon (or some other polygon) when viewed from the first end 162 of the body 160. The shape of the inner wall 164 at the first end 162 can match a torque tool (e.g., a hex key) to assemble the body 160 to the corresponding piston and rod assembly 18, 19.

Additionally or alternatively, an outer diameter of the body 160, as defined by the outer wall 165, can be greater at a first end portion of the body 160 associated with the first end 162 of the body 160 as compared to an outer diameter of the body 160, as defined by the outer wall 165, at a second end portion of the body 160 associated with the second end 163 of the body 160. According to one or more embodiments, the outer diameter of the outer wall 165 for the first body portion 168 can be constant and the outer diameter of the outer wall 165 for the second body portion 169 can vary, such as according to the plateau and valleys shown in FIG. 5. The relief features of the outer wall 165 at the second body portion 169 can be to reliably and effectively interface with the piston and rod assembly 18. Depending upon whether the first body portion 168 is exposed (as in FIG. 3 and FIG. 4) or unexposed (e.g., inside the counterbore 22 at the end of the rod 21 as in FIG. 7), some or all of the outer wall 165 can be threaded to interface with the corresponding piston and rod assembly 18, 19. For instance, when the first body portion 168 is exposed the outer wall 165 at the first body portion 168 may not have threads and some or all of the outer wall 165 at the second body portion 169 may be threaded. On the other hand, when the first body portion 168 is not exposed, threads may be provided in the outer wall 165 at the first body portion 168 and/or at the second body portion 169.

The sleeve 170 can be annular or in the form of a ring and can be made of a non-metal or non-metallic durable material or composite. The material/composite can be particularly resistant to wear against metal without abrading and/or generating hard particles. For instance, the sleeve 170 can be made of nylon (polyamide) filled with an additive, such as glass. Alternatively, the sleeve 170 can be polytetrafluoroethylene (PTFE) filled/unfilled material. Of course, embodiments of the disclosed subject matter are not limited to the foregoing materials for the sleeve 170. The sleeve 170 can be disposed in the bore 161 of the body 160 at a portion of the inner wall 164 such as shown in FIG. 5. Thus, the sleeve 170 can be radially outward of the sensor rod 35, such as shown in FIG. 3 and FIG. 4. More specifically, the inner wall 174 of the sleeve 170 can contact the sensor rod 35. In this regard, the sleeve 170 can protect the sensor rod 35 as the sensor rod 35 travels along the longitudinal axis 16 during operation of the fluid cylinder 10.

The length of the sleeve 170 can be less than the length of the body 160. According to one or more embodiments, no portion of the sleeve 170 may extend from either the first end 162 or the second end 163 of the body 160. Note, however, that in this example, the length of the sleeve 170 can be longer than that of the sleeve 70 for FIG. 2. For instance, the sleeve 170 can extend from the second end 163 of the body 160 into the first body portion 168 of the body 160.

Such extending may also mean that an inner-most diameter of the sleeve 170, as defined by the inner wall 174 of the sleeve 170, is less than an inner-most diameter of the inner wall 164 of the body 160. In this example, the inner wall 174 of the sleeve 170 can have an internal diameter less than any internal diameter defined by the inner wall 164 of the body 160.

According to one or more embodiments, the inner wall 174 of the sleeve 170 can have a substantially constant diameter, at least from the second end 163 of the body 160. However, in this example, an end of the sleeve 170 opposite the second end 163 of the body 160 can be tapered at an angle θ relative to the longitudinal axis 16 (e.g., at or about sixty degrees combined for opposite sides of the inner wall 174). Such tapering can facilitate passage of the sensor rod 35 through the retainer assembly 150.

Each of the one or more magnets 180 can be an angular magnet and can be disposed radially outward of at least a portion of an outer wall 175 of the sleeve 170. Thus, each of the one or more magnets 180 can be disposed between the sleeve 170 and the body 160, at least in a radial direction of the body 160. In this regard, the one or more magnets 180 can be provided also radially outward of the sensor rod 35. However, as shown in FIG. 5, no portion of the one or more magnets 180 can be exposed from the body 160 or the sleeve 170. Thus, no portion of the one or more magnets 180 can contact the sensor rod 35. Optionally, the one or more magnets 180 can be provided in a cutout (or cutouts) 177 of the sleeve 170, such as shown in FIG. 5.

At least a portion of the outer wall 175 of the sleeve 170 can be fixed to the inner wall 164 of the body 160. According to embodiments of the disclosed subject matter, the outer wall 175 of the sleeve 170 can be fixed to the inner wall 164 via friction fit, snap fit, or threading. The sleeve 170 in FIG. 5, for instance, can be inserted in the bore 161 such that elevations (e.g., ridges or projections) in the outer wall 175 snap fit with corresponding recesses in the inner wall 164 of the body 160.

Each of the one or more magnets 180 can be fixedly disposed between the sleeve 170 and the body 160. For instance, at the very least the sleeve 170 retained in the bore 161 can retain the one or more magnets 180 in position. The one or more magnets 180 may also be molded between the body 160 and the sleeve 170. According to embodiments of the disclosed subject matter, the one or more magnets 180 can be so-called in-molded to the inner wall 164 of the body 160 or can be so-called out-molded to the outer wall 175 of the sleeve 170. Such molding can occur prior to inserting the sleeve 170 into the bore 161 to fixedly attach the sleeve 170 to the body 160.

Figure 6:
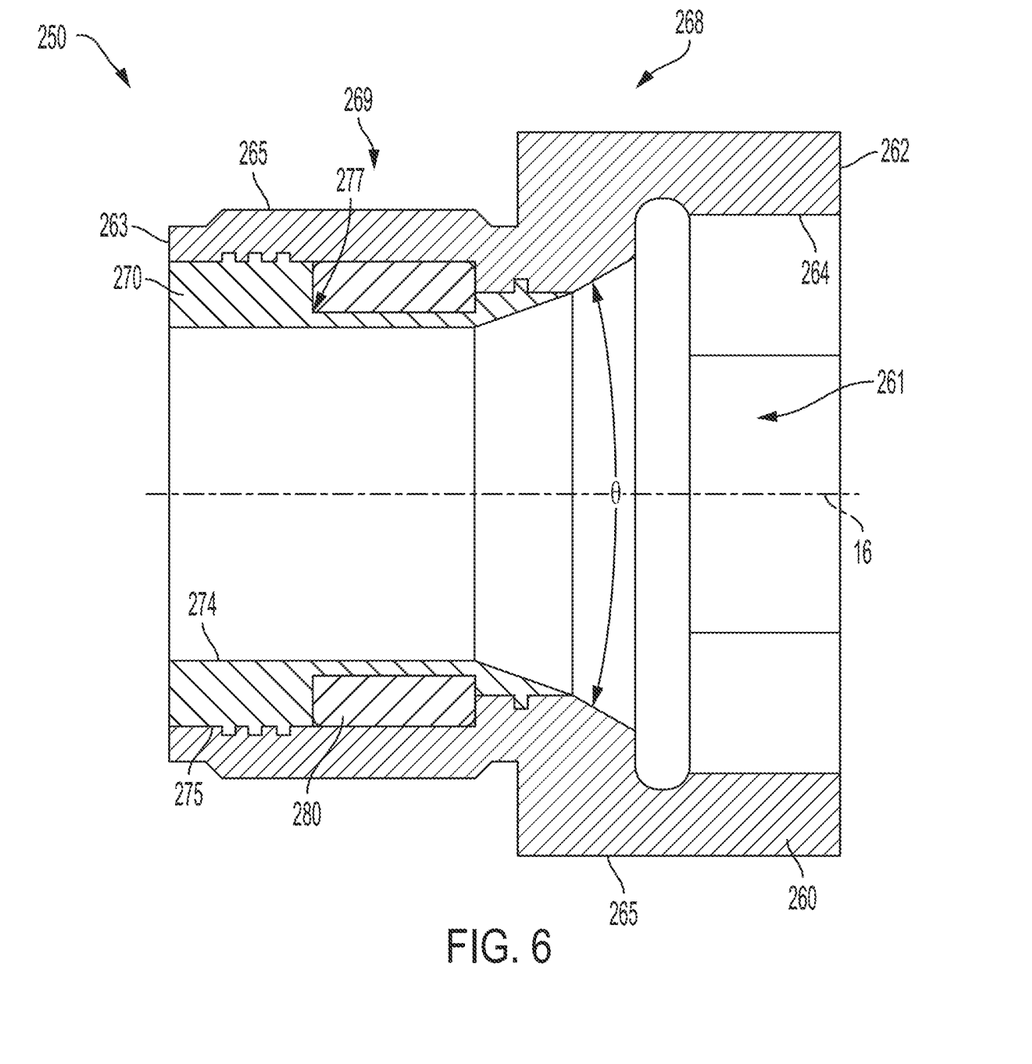
FIG. 6 shows a sectional view of another retainer assembly according to one or more embodiments of the disclosed subject matter.

FIG. 6 shows a sectional view of another retainer assembly 250. The retainer assembly 250 can be comprised of a body 260, a sleeve 270, and one or more magnets 280. According to one or more embodiments, the body 260, the sleeve 270, and the one or more magnets 280 may be the only components of the retainer assembly 250. Thus, the retainer assembly 250 may consist of the body 260, the sleeve 270, and the one or more magnets 280.

The body 260 can be annular and define a bore 261 that extends from a first end 262 of the body 260 to a second end 263 of the body 260. The bore 261 may be defined by an inner wall 264 of the body 260 opposite an outer wall 265 of the body 260. The bore 261 can be adapted to receive the sensor rod 35, such as shown above, whereby the sensor rod 35 extends from the first end 262 and the second end 263 of the body 260. According to one or more embodiments, the body 260 can be made of any non-ferromagnetic material, such as brass, aluminum, stainless steel, plastic, composite, etc. According to one or more embodiments, plain carbon steel or cast iron may not be used as a material for the body 260, unless the one or more magnets 280 are prevented from direct contact with the body 260.

The body 260 can be considered to have a first body portion 268 and a second body portion 269. The first body portion 268 and the second body portion 269 can be associated with (and indeed include) the first end 262 and the second end 263 of the body 260, respectively.

As shown in FIG. 6, the bore 261 can have a greater cross-sectional area or diameter, as defined by the inner wall 264, at the first end 262 as compared to the second end 263. According to one or more embodiments, the inner wall 264 at the first end 262 of the body 260 can be in the form of a hexagon (or some other polygon) when viewed from the first end 262 of the body 260. The shape of the inner wall 264 at the first end 262 can match a torque tool (e.g., a hex key) to assemble the body 260 to the corresponding piston and rod assembly 18, 19.

Additionally or alternatively, an outer diameter of the body 260, as defined by the outer wall 265, can be greater at a first end portion of the body 260 associated with the first end 262 of the body 260 as compared to an outer diameter of the body 260, as defined by the outer wall 265, at a second end portion of the body 260 associated with the second end 263 of the body 260. According to one or more embodiments, the outer diameter of the outer wall 265 for the first body portion 268 can be constant and the outer diameter of the outer wall 265 for the second body portion 269 can vary, such as according to the plateau and valleys shown in FIG. 6. The relief features of the outer wall 265 at the second body portion 269 can be to reliably and effectively interface with the piston and rod assembly 18. Depending upon whether the first body portion 268 is exposed (e.g., as in FIG. 1 or FIG. 3 and FIG. 3) or unexposed (e.g., inside the counterbore 22 at the end of the rod 21 as in FIG. 7), some or all of the outer wall 265 can be threaded to interface with the corresponding piston and rod assembly 18, 19. For instance, when the first body portion 268 is exposed the outer wall 265 at the first body portion 268 may not have threads and some or all of the outer wall 265 at the second body portion 269 may be threaded. On the other hand, when the first body portion 268 is not exposed, threads may be provided in the outer wall 265 at the first body portion 268 and/or at the second body portion 269.

The sleeve 270 can be annular or in the form of a ring and can be made of a non-metal or non-metallic durable material or composite. The material/composite can be particularly resistant to wear against metal without abrading and/or generating hard particles. For instance, the sleeve 270 can be made of nylon (polyamide) filled with an additive, such as glass. Alternatively, the sleeve 270 can be polytetrafluoroethylene (PTFE) filled/unfilled material. Of course, embodiments of the disclosed subject matter are not limited to the foregoing materials for the sleeve 270. The sleeve 270 can be disposed in the bore 261 of the body 260 at a portion of the inner wall 264 such as shown in FIG. 6. Thus, the sleeve 270 can be radially outward of the sensor rod 35, such as discussed above. More specifically, the inner wall 274 of the sleeve 270 can contact the sensor rod 35. In this regard, the sleeve 270 can protect the sensor rod 35 as the sensor rod 35 travels along the longitudinal axis 16 during operation of the fluid cylinder 10.

The length of the sleeve 270 can be less than the length of the body 260. According to one or more embodiments, no portion of the sleeve 270 may extend from either the first end 262 or the second end 263 of the body 260. Note, however, that in this example, the length of the sleeve 270 can be longer than that of the sleeve 70 for FIG. 2. For instance, the sleeve 270 can extend from the second end 263 of the body 260 into the first body portion 268 of the body 260.

Such extending may also mean that an inner-most diameter of the sleeve 270, as defined by the inner wall 274 of the sleeve 270, is less than an inner-most diameter of the inner wall 264 of the body 260. In this example, the inner wall 274 of the sleeve 270 can have an inner diameter less than any inner diameter defined by the inner wall 264 of the body 260.

According to one or more embodiments, the inner wall 274 of the sleeve 270 can have a substantially constant diameter, at least from the second end 263 of the body 260. However, in this example, an end of the sleeve 270 opposite the second end 263 of the body 260 can be tapered at an angle θ relative to the longitudinal axis 16 (e.g., at or about sixty degrees combined for opposite sides of the inner wall 274). In this example, the inner wall 264 of the body 260 can also be tapered relative to the longitudinal axis 16. Optionally, the angles of taper for the inner wall 274 of the sleeve 270 and the inner wall 264 of the body 260 can be the same angle θ (e.g., at or about sixty degrees combined for opposite sides). Such tapering can facilitate passage of the sensor rod 35 through the retainer assembly 250.

Each of the one or more magnets 280 can be an angular magnet and can be disposed radially outward of at least a portion of an outer wall 275 of the sleeve 270. Thus, each of the one or more magnets 280 can be disposed between the sleeve 270 and the body 260, at least in a radial direction of the body 260. In this regard, the one or more magnets 280 can be provided also radially outward of the sensor rod 35. However, as shown in FIG. 6, no portion of the one or more magnets 280 can be exposed from the body 260 or the sleeve 270. Thus, no portion of the one or more magnets 280 can contact the sensor rod 35. Optionally, the one or more magnets 280 can be provided in a cutout (or cutouts) 277 of the sleeve 270, such as shown in FIG. 6.

At least a portion of the outer wall 275 of the sleeve 270 can be fixed to the inner wall 264 of the body 260. According to embodiments of the disclosed subject matter, the outer wall 275 of the sleeve 270 can be fixed to the inner wall 264 via friction fit, snap fit, or threading. As shown in FIG. 6, the inner wall 264 of the body 260 can have a plurality of sets of one or more grooves adapted to interface with corresponding projects on the outer wall 275 of the sleeve 270. Such features can be provided to limit or prevent any movement of the molded in materials once molded. Otherwise, the material (e.g., polymer) may slide axially.

Each of the one or more magnets 280 can be fixedly disposed between the sleeve 270 and the body 260. For instance, at the very least the sleeve 270 retained in the bore 261 can retain the one or more magnets 280 in position. The one or more magnets 280 may also be molded between the body 260 and the sleeve 270. According to embodiments of the disclosed subject matter, the one or more magnets 280 can be so-called in-molded to the inner wall 264 of the body 260 or can be so-called out-molded to the outer wall 275 of the sleeve 270. Such molding can occur prior to inserting the sleeve 270 into the bore 261 to fixedly attach the sleeve 270 to the body 260.

INDUSTRIAL APPLICABILITY

As noted above, the present disclosure relates to linear fluid cylinders, and more particularly to linear fluid cylinders having an internally-mounted linear cylinder position sensor retainer assembly and systems, assemblies, components, and methods thereof.

Retainer assemblies according to embodiments of the disclosed subject matter, such as retainer assemblies 50, 150, 250 discussed above, can be adapted to interface with a sensor rod of an in-cylinder position sensor assembly of a fluid cylinder, such as position sensor assembly 30 in fluid cylinder 10 discussed above. Retainer assemblies according to embodiments of the disclosed subject matter can retain one or more magnets between a body and a sleeve of the retainer assembly, such as one or more magnets 80, 180, 280 between body 60, 160, 260 and sleeve 70, 170, 270. The one or more magnets can be injection molded in place according to one or more embodiments. Thus, the one or more magnets can be retained in position prior to and after assembly of the retainer assembly.

Moreover, the one or more magnets can be insulated by at least the sleeve. Hence, the one or more magnets may not contact the sensor rod of the position sensor assembly, since the sleeve can intervene between the one or more magnets and the sensor rod. In that at least the sleeve can be made of the non-metal or non-metallic material and can be provided between the one or more magnets and the sensor rod, metal-to-metal contact between the sensor rod and another metal or metallic component, such as the one or more magnets, can be prevented.

Retainer assemblies according to embodiments of the disclosed subject matter can also provide support for the sensor rod and avoid or minimize damage to the sensor and the magnet upon assembly and/or operation of the fluid cylinder. For instance, the sensor rod can be retained at the longitudinal axis of the fluid cylinder using retainer assemblies according to embodiments of the disclosed subject matter.

While aspects of the present disclosure have been particularly shown and described with reference to the embodiments above, it will be understood by those skilled in the art that various additional embodiments may be contemplated by the modification of the disclosed machines, assemblies, systems, and methods without departing from the spirit and scope of what is disclosed. Such embodiments should be understood to fall within the scope of the present disclosure as determined based upon the claims and any equivalents thereof.

The invention claimed is:

1. A hydraulic cylinder comprising:
an elongate body defining an internal cavity that extends along a longitudinal axis of the elongate body;
a pair of end cap at opposite ends of the elongate body;
a piston and rod assembly at least partially in the internal cavity, the piston and rod assembly being movable in a direction of the longitudinal axis;
a position sensor and a sensor rod in the internal cavity, the sensor rod extending along the longitudinal axis; and
a sensor retainer assembly in the internal cavity, the sensor retainer assembly being coaxial with the sensor rod and adapted to retain the sensor rod at the longitudinal axis, the sensor retainer assembly including:
- an annular body defining a bore extending from opposite ends of the annular body, the bore being adapted to receive the sensor rod such that the sensor rod extends from the opposite ends of the annular body,
- a magnet ring disposed in the bore at an inner wall of the annular body, the magnet ring being radially outward of the sensor rod, and
- one or more magnets fixedly disposed between the annular body and the magnet ring in a radial direction of the annular body, the one or more magnets being radially outward of the sensor rod, and the magnet ring being between the one or more magnets and the sensor rod in the radial direction of the annular body such that the one or more magnets do not contact the sensor rod and metal-to-metal contact between the one or more magnets and the sensor rod is prevented in order to prevent damage to either the sensor rod or the one or more magnets.

2. The hydraulic cylinder according to claim 1, wherein the magnet ring is made of a non-metallic material.

3. The hydraulic cylinder according to claim 1, wherein each of the one or more magnets is molded between the annular body and the magnet ring.

4. The hydraulic cylinder according to claim 1, wherein no portion of each of the one or more magnets contacts the sensor rod.

5. The hydraulic cylinder according to claim 1, wherein an inner wall of the magnet ring contacts the sensor rod.

6. The hydraulic cylinder according to claim 1, wherein no portion of the magnet ring extends from the annular body.

7. The hydraulic cylinder according to claim 1, wherein an outer wall of the magnet ring is fixed to the inner wall of the annular body via friction fit, snap fit, or threading.

8. A retainer assembly adapted to interface with a sensor rod of an in-cylinder position sensor assembly of a fluid cylinder, the retainer assembly comprising:
- an annular body defining a bore extending from a first end of the annular body to a second end of the annular body opposite the first end, the bore being adapted to receive the sensor rod such that the sensor rod extends from the first and second ends of the annular body;
- a sleeve disposed in the bore at an inner wall of the annular body, a length of the sleeve being less than a length of the annular body; and
- one or more magnets fixedly molded between the annular body and the sleeve in a radial direction of the annular body,
- wherein an inner diameter of the bore at a first end portion of the annular body changes and an inner diameter of the sleeve at a second end portion of the annular body is constant for a predetermined length from the second end of the annular body.

9. The retainer assembly according to claim 8, wherein no portion of each of the one or more magnets is exposed from the annular body and the sleeve.

10. The retainer assembly according to claim 8, wherein the bore has a greater cross-sectional area at the first end of the annular body than at the second end of the annular body.

11. The retainer assembly according to claim 8, wherein an outer diameter of the annular body at a first end portion thereof is greater than an outer diameter of the annular body at a second end portion thereof.

12. The retainer assembly according to claim 8, wherein no portion of the sleeve extends from the first end or the second end of annular body.

13. The retainer assembly according to claim 8, wherein an outer wall of the sleeve is fixed to the inner wall of the annular body via friction fit, snap fit, or threading.

14. A method regarding a retainer assembly adapted to interface with a sensor rod of an in-cylinder position sensor assembly of a fluid cylinder, the method comprising:
- providing an annular body of the retainer assembly, the annular body defining a bore extending from a first end of the annular body to a second end of the annular body opposite the first end;
- providing a sleeve of the retainer assembly, the sleeve being disposed in the bore at an inner wall of the annular body; and
- providing one or more magnets of the retainer assembly, the one or more magnets being fixedly molded between the annular body and the sleeve in a radial direction of the annular body, the one or more magnets directly contacting each of the annular body and the sleeve such that the one or more magnets are completely surrounded by the annular body and the sleeve such that the one or more magnets do not contact the sensor rod and metal-to-metal contact between the one or more magnets and the sensor rod is prevented in order to prevent damage to either the sensor rod or the one or more magnets.

15. The method according to claim 14, further comprising:
- assembling the retainer assembly to a piston and rod assembly of the fluid cylinder; and
- providing the sensor rod through the bore of the annular body of the retainer assembly such that the sensor rod extends from the first end and the second end of the annular body and is radially inward of the piston and rod assembly.

16. The method according to claim 14, further comprising inserting the sleeve in the bore from the second end of the annular body such that each of the one or more magnets is between the annular body and the sleeve in the radial direction of the annular body.

17. The method according to claim 14, wherein each of the one or more magnets is in-molded to the inner wall of the annular body or out-molded to an outer wall of the sleeve prior to assembling the sleeve and the annular body.

18. The method according to claim 14,
- wherein the sleeve is made of a non-metallic material,
- wherein a length of the sleeve is less than a length of the annular body, and
- wherein an outer wall of the sleeve is fixed to the inner wall of the annular body via friction fit, snap-fit, or threading.

19. The method according to claim 14, wherein each of the one or more magnets is provided in a cutout of the sleeve.

* * * * *